Sept. 12, 1950      H. E. DAVIDSON      2,521,779
POWER CLUTCH SHIFTER

Filed Oct. 3, 1944      5 Sheets-Sheet 1

Inventor
Harvey E. Davidson.
By R. S. C. Dougherty.
Attorney

Sept. 12, 1950     H. E. DAVIDSON     2,521,779
POWER CLUTCH SHIFTER
Filed Oct. 3, 1944     5 Sheets—Sheet 3

Inventor
Harvey E. Davidson
By R. S. A. Dougherty
Attorney

Sept. 12, 1950  H. E. DAVIDSON  2,521,779
POWER CLUTCH SHIFTER
Filed Oct. 3, 1944  5 Sheets-Sheet 4

Inventor
Harvey E. Davidson.
By R. S. C. Dougherty
Attorney

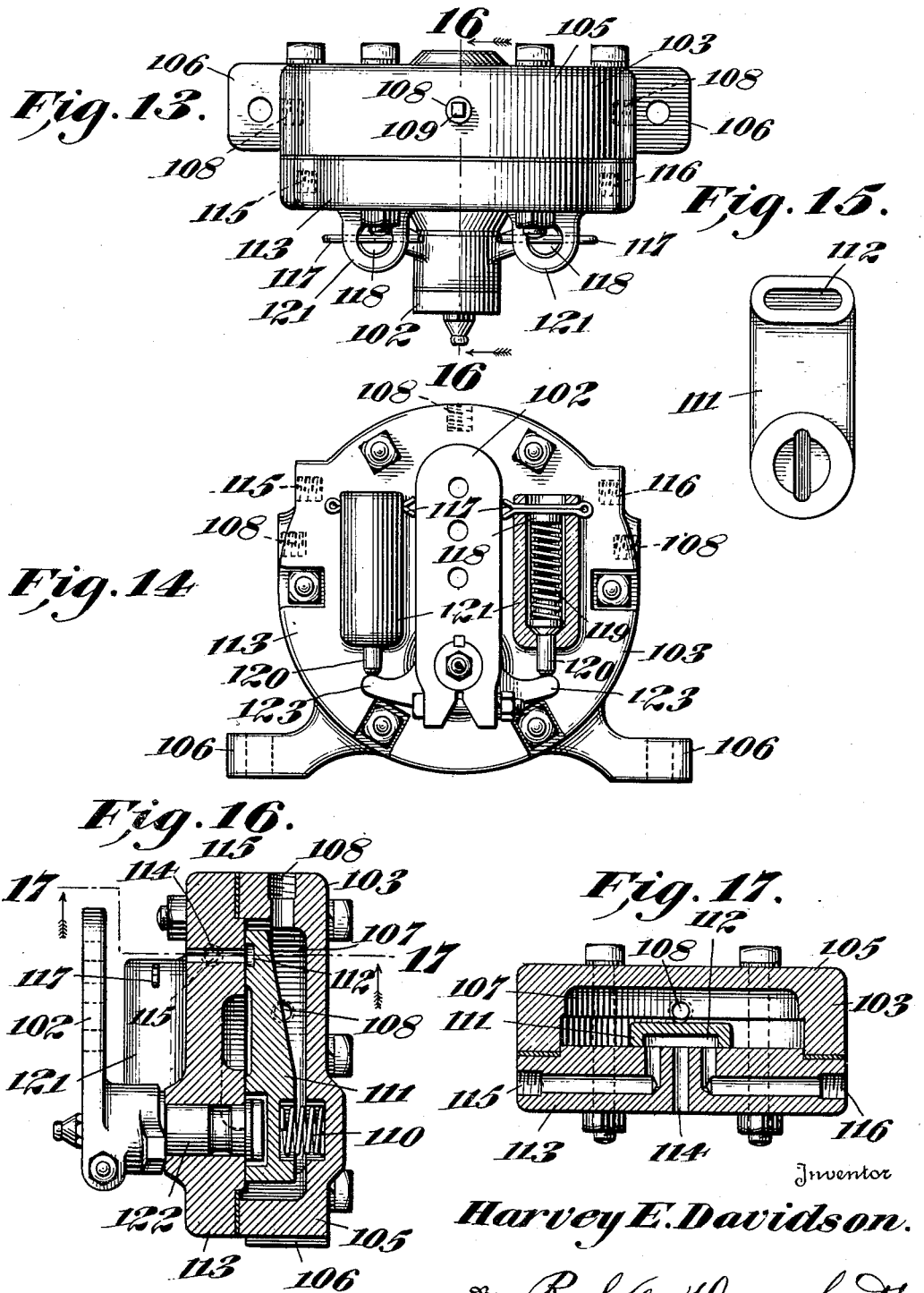

Patented Sept. 12, 1950

2,521,779

UNITED STATES PATENT OFFICE 2,521,779

POWER CLUTCH SHIFTER

Harvey Ellis Davidson, Tulsa, Okla., assignor, by mesne assignments, to Bethlehem Supply Company, a corporation of Delaware Application October 3, 1944, Serial No. 556,932

3 Claims. (Cl. 192—87)

My invention relates to clutch-operating means, and particularly to power-actuated devices for operating large clutches on hoisting equipment or the like.

The multiplicity of heavy clutches used on oil field draw works and similar hoisting and drilling equipment can usually be engaged and disengaged only slowly and with considerable physical effort on the part of the operator. Anything which decreases the labor of shifting these clutches will reduce his fatigue and enable him to operate the hoist more rapidly and efficiently.

One object of my invention, therefore, is to provide a more flexible and easily operated draw works.

A further object is a safe and convenient means for power-operating a multiplicity of clutches.

Another object is a simpler and more efficient means for performing rapid change-overs between low and high speed drives on a rotary draw works.

Still another object is a reliable fluid-operated means for providing any desired degree of drum clutch engagement in controlled hoisting or lowering operations.

Other objects and purposes of this invention will appear hereinafter in the specification and in the appended claims.

Referring to the annexed five sheets of drawings, in which like characters of reference indicate like parts:

Fig. 13 is a top plan view of one of the air control valves;

Fig. 14 is a front elevation of said air control valve, showing the lever return mechanism partly in section;

Fig. 15 is a detail of the distributor slide plate in said valve;

Fig. 16 is a section on the line 16—16 of Fig. 13; and

Fig. 17 is a section on the line 17—17 of Fig. 16.

Figure 1:
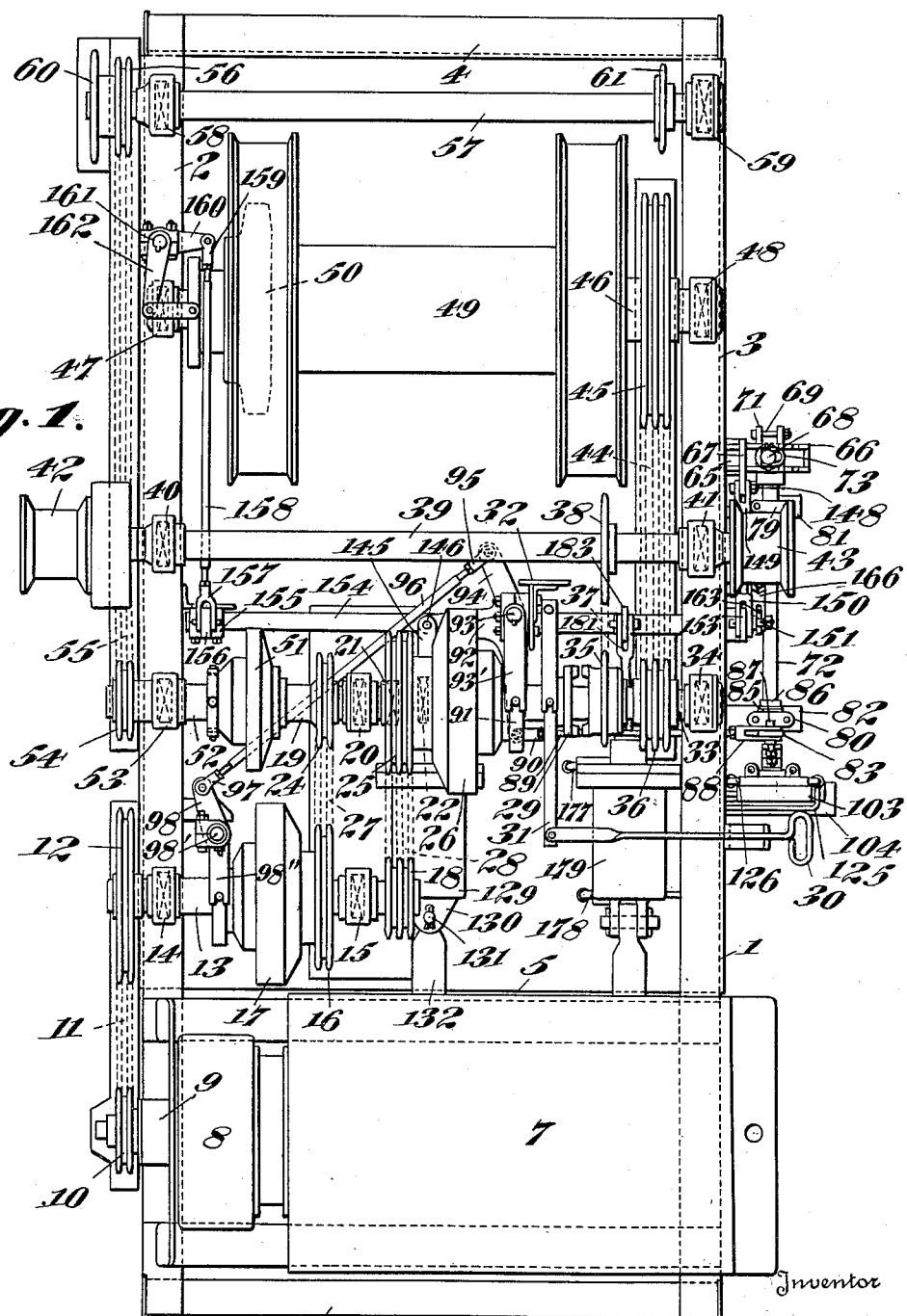
Figure 1 is a schematic diagram of a hoist or draw works incorporating my invention.

Referring to the schematic diagram of Fig. 1, the base or frame assembly 1 is formed of the longitudinal I-beam members 2 and 3 held in rigid spaced relation by the transverse I-beam members 4, 5, and 6.

Upon said frame assembly 1 is mounted the engine 7 and the hydraulic drive 8, provided with the shaft 9 and the small sprocket 10, which through the chain 11 and large sprocket 12 drive the primary shaft 13 journaled in the bearings 14 and 15. The large free sprocket 16 on said shaft is adapted to be engaged to or disengaged from said primary shaft 13 by the high-drive clutch 17, while the small sprocket 18 is permanently fixed to the said shaft 13.

The secondary shaft 19 journaled in the bearings 20, 21 and 22 is provided with the small fixed sprocket 24 and the large free sprocket 25, which latter sprocket 25 is adapted to be engaged to and disengaged from the said shaft 19 by means of the low-drive clutch 26. The high-drive sprockets 16 and 24 are interconnected by the chain 27, and the low-drive sprockets 18 and 25 are interconnected by the chain 28.

One end of said secondary shaft 19 is connected by the jaw clutch 29, actuated by the notched hand lever 30 and bifurcated lever 31 pivotally mounted on the shield frame 32, to the shaft 33, journaled in bearings 34 and provided with the sprockets 35 and 36. Said sprocket 35 is connected by the chain 37 to sprocket 38 on the catshaft 39 journaled in bearings 40 and 41 and provided with the cathead pulleys 42 and 43. The sprocket 36 is connected by the chain 44 to the sprocket 45 on the drum-shaft 46, journaled in bearings 47 and 48 and rotatably supporting the hoisting drum 49 and drum clutch 50.

The other end of the secondary shaft 19 is connected by the rotary drive clutch 51, actuated by a hand lever (not shown) or the like, to the shaft 52 journaled in bearings 53, which shaft 52 is provided with a sprocket 54 connected by a chain 55 to the sprocket 56 of the rotary drive-shaft 57 journaled in bearings 58 and 59. Said shaft 57 is also provided with the conventional sprockets 60 and 61 for supplying power to rotary drilling tables or the like (not shown).

Figure 3:
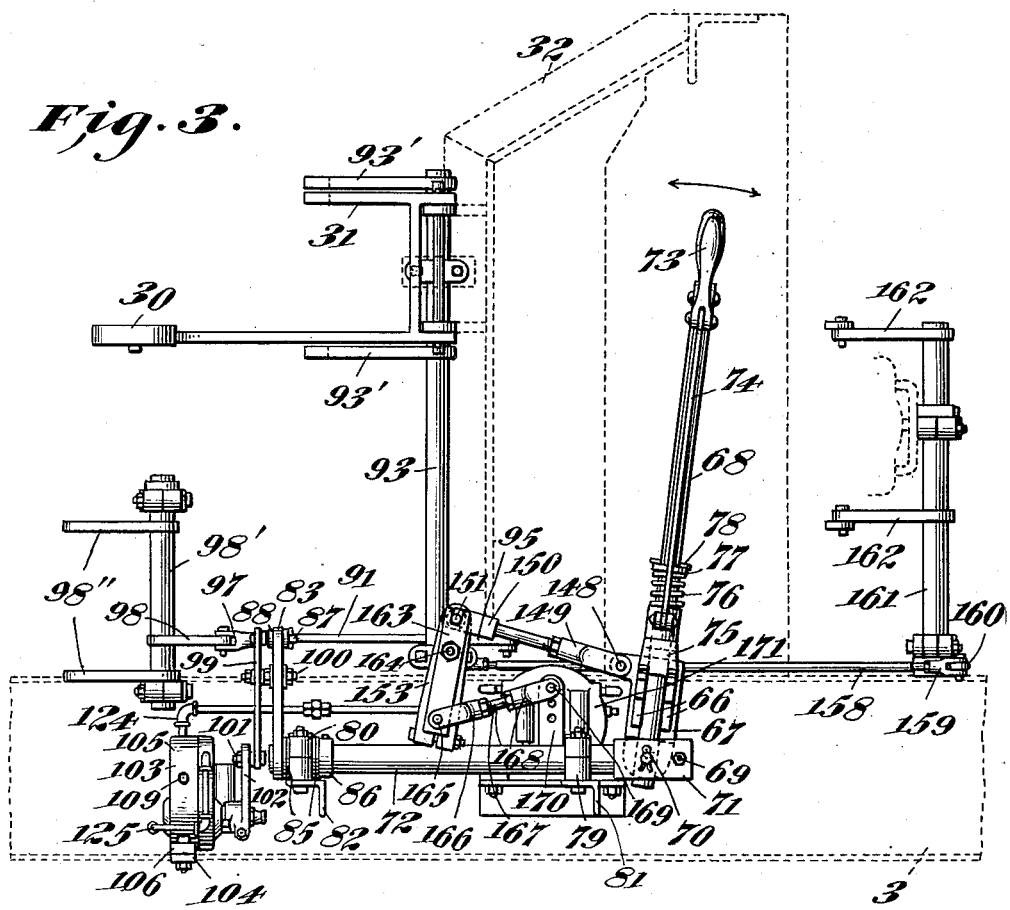
Fig. 3 is a side elevation of the clutch-shifting lever, valves, and linkage.
Figures 4, 5:
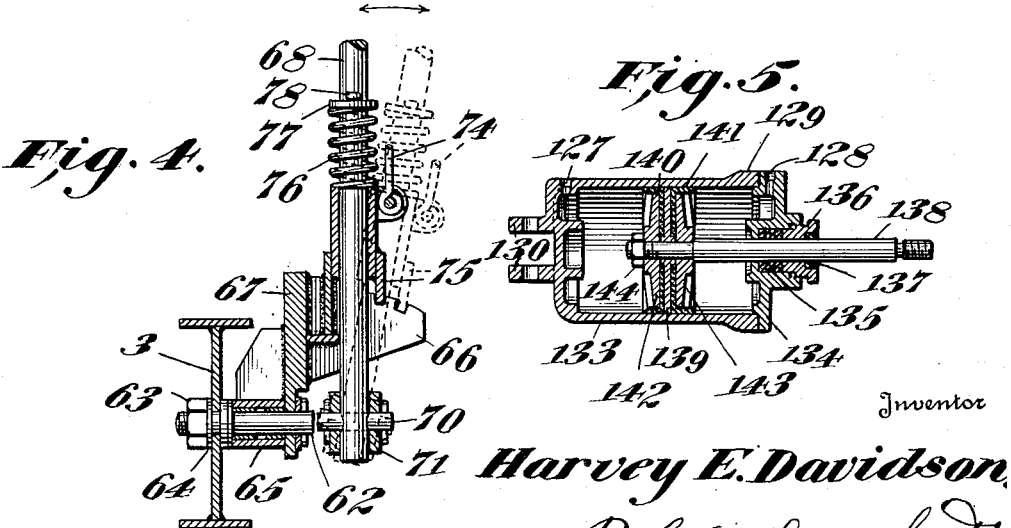
Fig. 4 is a sectional detail of the clutch-shifting lever.
Fig. 5 is a section of one of the clutch-actuating air cylinders.
Figure 6:
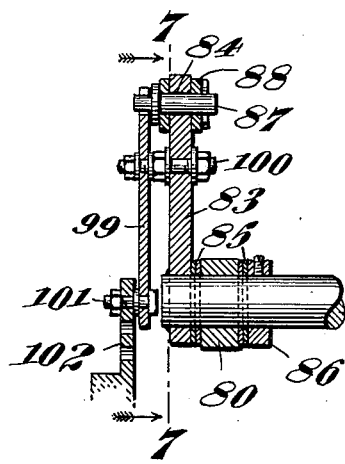
Fig. 6 is a sectional detail of the high-low shifter lever.
Figure 7:
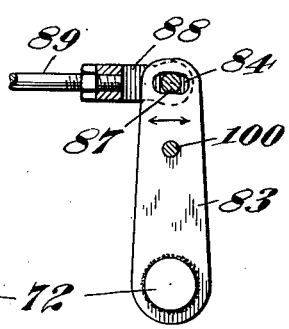
Fig. 7 is a section taken on the line 7—7 of Fig. 6.
Figure 8:
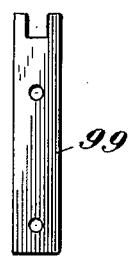
Fig. 8 is a detail of the small air valve actuating lever shown in Fig. 6.

Referring now to Figs. 3 and 4 of the drawings, the longitudinal I-beam member 3 is provided with the protruding annularly flanged stub shaft 62, threaded and held in place by the locknut 63 and washer 64, upon which on bearing 65 pivots the double ratchet quadrant 66 with welded bracket plate 67. The two-way operating lever 68 pivoted to be moved sidewise or endwise to the stop-bolt 69 on the pin 70 in the bifurcated end 71 of the rock-shaft 72 is provided with the ratchet lever 73 fulcrumed thereto and adapted by link 74 to raise the dog 75 against the spring 76 held by bushing 77 and pin 78 in the ratchet quadrant 66.

The rock-shaft 72 is journaled in bearings 79 and 80 supported on brackets 81 and 82 and terminates in the lever arm 83 provided with slot 84 and held against the bearing 80 and bushings 85 by the set-collar 86. By means of the lost motion connection provided by the pin 87 in said slot 84, clevis 88, link 89, clevis 90, arm 91 of double bell crank 92, and rock shaft 93, connection is made through the dual lever arms 93′ to the low-drive clutch 26, and through the further means of the arm 94 of said double bell crank 92, clevis 95, link 96 and clevis 97 to the lever 98 and rock shaft 98′ provided with lever arms 98″ actuating the high-drive clutch 17.

The small lever 99 on the lever arm 83 is pivoted on the bolt 100 with one end engaging the clevis pin 87 and the other end attached by the bolt 101 to the operating lever 102 of air valve 103 on bracket 104.

Referring to Figs. 13 to 17, inclusive, said air valve 103 comprises the back plate casting 105 provided with mounting lugs 106 and the central chamber 107 and a plurality of inlet ports 108, those inlet ports not in actual use being closed by plugs 109; the spring 110; the movable slide plate 111 provided with an upper channel or recessed portion 112 as shown in Fig. 15; the face plate 113 provided with the central exhaust 114 and the side outlet ports 115 and 116, and the cotter-pin 117, spring-retainer 118, spring 119, and spring-pin 120 in each of the spring-sockets 121; and the said operating lever 102 keyed to the valve shaft 122 and normally held perpendicular by the equal counter-pressures of the spring-pins 120 on the side lugs or ears 123.

Air supply pipe 124 connects a compressor or the like (not shown) to the selected inlet port 108 of the valve 103. Flexible copper tubes 125 and 126 connect the outlet ports 115 and 116 thereof to the inlets 127 and 128 respectively of the double-acting air cylinder 129, pivotally mounted on lugs 130 by pin 131 on bracket 132 secured to the I-beam member 5.

Said air cylinder 129, as shown in Fig. 5, comprises the outer casing 133 and bolted-on cover 134. Through the packing 135, gland 136 and oil seal 137 of said cover passes the threaded piston rod 138, provided at its inner end with the piston plate 139, leather cups 140 and 141, follower plates 142 and 143, and jam nut 144, and at its outer end provided with the clevis 145 pivotally attached by pin 146 to the arm 147 of the double bell crank 92.

Figure 2:
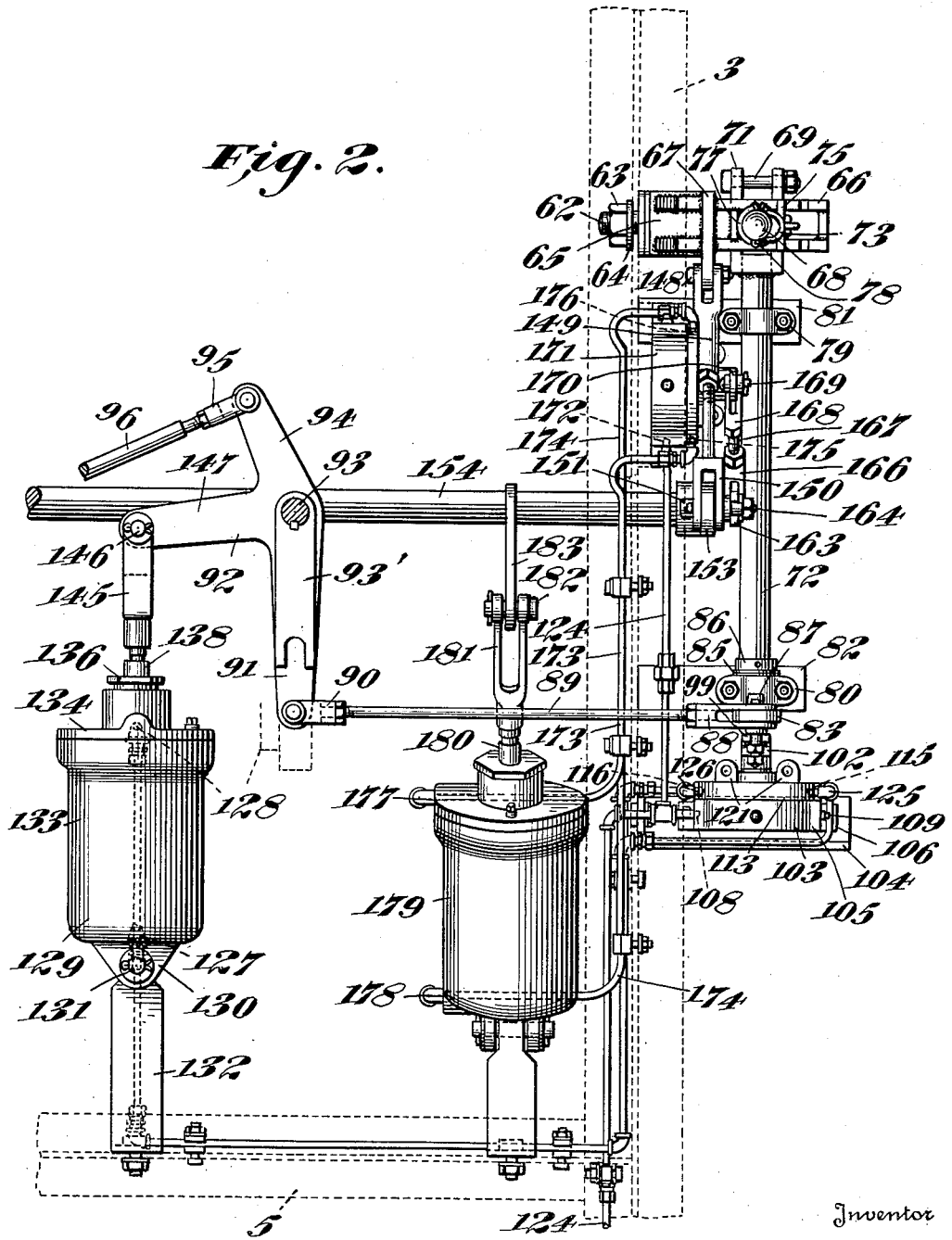
Fig. 2 is a top plan view of the clutch-shifting mechanism of my invention.
Figure 9:
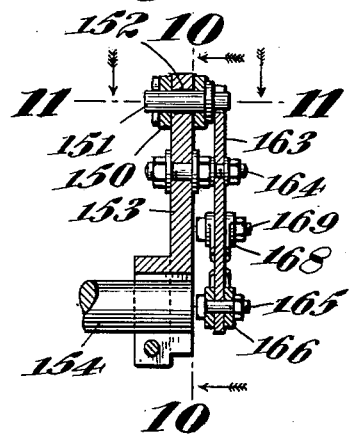
Fig. 9 is a sectional detail of the drum clutch shifter lever.
Figure 10:
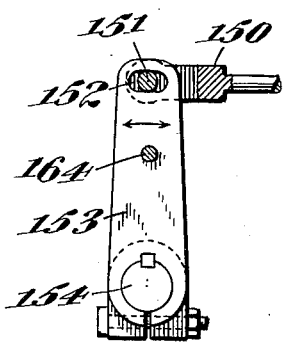
Fig. 10 is a section on the line 10—10 of Fig. 9.
Figure 11:
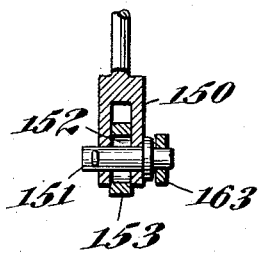
Fig. 11 is a section on the line 11—11 of Fig. 9.
Figure 12:
Fig. 12 is a side elevation of the notched hand lever for shifting the jaw clutch.

Referring to Figs. 2 and 3, the pin 148 provides a pivotal attachment to bracket plate 67 for clevis 149 and bifurcated link 150. Said link 150 is provided with a lost motion connection by means of the pin 151 loosely movable in the slot 152 of lever arm 153 (Figs. 9-11) keyed to rock-shaft 154 journaled in bearings 155. By means of the lever 156, clevis 157, link 158, clevis 159, bell crank 160, shaft 161 and bifurcated lever 162, the drum clutch 50 is operably connected to said rockshaft 154.

With reference to Fig. 3 and Figs. 9 to 11, inclusive, the small lever arm 163 is attached to the pin 151, and is pivotally secured to lever arm 153 by the bolt 164. The bottom of said lever arm 163 is pivotally secured by pin 165 to the clevis 166, link 167, and clevis 168 pivoting by pin 169 to lever arm 170 of air valve 171. Air supply pipe 124 communicates with the inlet port 172 of said air valve 171 and copper tubes 173 and 174 connect the outlet ports 175 and 176 to the inlets 177 and 178 respectively of the pivoted double-acting air cylinder 179. Piston-rod 180 of said air cylinder 179 is provided with the clevis 181 pivotally attached by the pin 182 to the crank-arm 183. Said air valve 171 and air cylinder 179 are substantially identical in construction with the above-described air valve 103 and air cylinder 129 respectively.

In operation, the lever 68 may be moved parallel to the machine, as shown by the arrow of Fig. 3, for placing the drum clutch in or out, or laterally, as indicated by the arrow in Fig. 4, for low or high drive clutch engagement. For the low to high shift when the hand lever 68 is moved in or out, the rock-shaft 72 will be rotated so that the lever arm 83 will be moved in or out. Said lever arm 83 can travel the length of the slot 84 without moving the link 89, but any movement of this lever arm 83 will tend to cause the small lever 99 to pivot on clevis pin 87 and bolt 100 and operate the air valve lever 102. The air valve 103 will then admit air to the proper side of the air cylinder 129, thus aiding in making the shift directed by the hand lever 68. Substantially the same procedure applies to the operation of shifting in or out the drum clutch 50. It is therefore possible with very little effort to shift the clutches in any manner desired, whether completely or partially or rapidly or slowly, with the air control in all cases tending to follow the operation of the hand lever. Even if the air supply of the actuating mechanism should fail the clutches can still be shifted manually.

It will be understood that brakes and actuating mechanism therefor on the hoisting drum 49 may be of any known type, or they may be of the improved construction set forth in my copending application, Serial No. 534,508, filed May 6, 1944, now Letters Patent No. 2,389,031, issued November 13, 1945, for Braking Device.

Although I have shown and described my invention in considerable detail, I do not wish to be limited to the exact construction shown and described, but may use such substitutions, modifications, or equivalents thereof as are embraced within the scope of my invention or pointed out in the appended claims.

In accordance with the statute, what I claim as new and useful is:

1. In a drawworks apparatus of the class described, including a hoisting drum, alternatively engageable high and low drive clutches connected together and a separate drum clutch, the combination of a plurality of fluid pressure operated clutch-actuating mechanisms, a separate control valve mechanism for actuating each clutch-actuating mechanism, linkage means connected to each control valve mechanism, a single manually operated control lever movable in two planes at right angles to each other for selectively actuating the control valve mechanisms through the linkage means, and a lost motion connection between the control lever and each clutch-actuating mechanism, whereby the drum clutch may be engaged or disengaged and the selected one of the high or low drive clutches may be engaged while the other is disengaged.

2. In an apparatus of the class described including a hoisting drum, high and low speed drive clutches and a drum clutch, the combination of a base frame, side brackets on said base frame, bearings mounted on said brackets, a rock-shaft journaled parallel to the base in said bearings, a hand lever pivotally mounted on said rock-shaft, linkage between the rock-shaft and the low speed drive clutch for engaging or disengaging said clutch, linkages between the high and low speed drive clutches so arranged and adapted that one clutch is engaged as the other is disengaged, a stub shaft secured to the base frame adjacent the hand lever, a bracket plate pivoting on said stub shaft, a ratchet quadrant secured to said bracket plate, a dog on the hand lever adapted to engage said ratchet quadrant, a bushing above the dog on the hand lever, a spring between the dog and the bushing to hold the dog normally in engagement with the ratchet quadrant, a link attached to the dog, a lever fulcrumed to the hand lever pivoted to said link to raise the dog from the quadrant to release said hand lever for lateral motion, and linkage between the quadrant bracket plate and the drum clutch for actuating said clutch by the longitudinal motion of the hand lever.

3. In an apparatus of the class described including a hoisting drum, high and low speed drive clutches and a drum clutch, the combination of a supporting base frame, a quadrant pivotally secured to said base frame, a rock-shaft pivotally mounted beneath said quadrant at a right angle thereto, a hand lever mounted on said rock-shaft, means on the hand lever arranged and adapted to movably fasten said lever upon the quadrant, linkages between the rock-shaft and the high and low speed drive clutches so arranged and adapted that one of the said clutches will be engaged and the other will be disengaged upon partial rotation of the rock-shaft by the hand lever, and linkage connected between the quadrant and the drum clutch for actuating said clutch upon motion imparted to the quadrant by the hand lever.

HARVEY ELLIS DAVIDSON.

REFERENCES CITED

The following references are of record in the file of this patent:

UNITED STATES PATENTS

| Number | Name | Date |
|---|---|---|
| 718,916 | Covell | Jan. 20, 1903 |
| 1,357,643 | Lawson | Nov. 2, 1920 |
| 1,528,139 | Wilkinson | Mar. 3, 1925 |
| 1,790,168 | Paul | Jan. 27, 1931 |
| 1,957,504 | Ponti | May 8, 1934 |
| 2,009,889 | Hild | July 30, 1935 |
| 2,082,410 | McCauley | June 1, 1937 |
| 2,151,881 | Wilson | Mar. 28, 1939 |
| 2,176,170 | Flowers | Oct. 17, 1939 |
| 2,179,082 | Benson | Nov. 7, 1939 |
| 2,205,300 | Marsh | June 18, 1940 |
| 2,207,797 | Guier | July 16, 1940 |
| 2,321,098 | Morse | June 8, 1943 |
| 2,337,166 | Overbeke | Dec. 21, 1943 |
| 2,351,851 | Young | June 20, 1944 |

FOREIGN PATENTS

| Number | Country | Date |
|---|---|---|
| 483,069 | Great Britain | July 6, 1936 |
| 708,802 | France | May 5, 1931 |